United States Patent [19]

Villar

[11] 4,268,257

[45] May 19, 1981

[54] WHEEL SIMULATOR

[75] Inventor: Luis F. Villar, Westbury, N.Y.

[73] Assignee: Servo Corporation of America, Hicksville, N.Y.

[21] Appl. No.: 104,072

[22] Filed: Dec. 17, 1979

[51] Int. Cl.³ .............................................. G09B 25/00
[52] U.S. Cl. ................................. 434/373; 73/432 SD
[58] Field of Search ........... 35/49, 50; 73/146, 432 SD

[56] References Cited

U.S. PATENT DOCUMENTS

| | | | |
|---|---|---|---|
| 1,087,295 | 2/1914 | Jaros | 35/49 |
| 3,119,257 | 1/1964 | Speer | 73/146 |
| 3,705,531 | 12/1972 | Wandrisco | 73/146 |

FOREIGN PATENT DOCUMENTS 599992  3/1978  U.S.S.R. .......................... 73/432 SD

Primary Examiner—Harland S. Skogquist
Attorney, Agent, or Firm—Gerald Levy

[57] ABSTRACT

A device to simulate the rolling of a hypothetical wheel along a path is provided. The device includes a wheel sector mounted to one end of a rotor. A drive is provided for rotating the rotor in one direction and the sector in the opposite direction so that the sector remains substantially tangent to a line segment. The wheel sector is driven by a pulley the diameter of which is one-half that of a drive pulley rotated with the rotor.

6 Claims, 2 Drawing Figures

WHEEL SIMULATOR

BACKGROUND OF THE INVENTION

The present invention relates to a wheel simulating machine and in particular to a stationary device which simulates the movement of a wheel along a straight line during a selected interval of time and at approximately constant velocity.

In the design of many types of equipment for rolling stock, it is necessary to investigate the rolling stock along its path of travel and the interaction between the moving wheels and the equipment or components thereof. This poses extreme difficulties particularly where the rolling stock is of relatively large size such as a railroad car and the desired speed of travel encompasses a wide range.

In many instances all that need be observed to obtain needed data is a segment of a wheel and its interactions as it moves along a relatively small path segment. This occurs quite often in the design of railroad equipment such as hot box detectors, wheel sensors, wheel trips, and the like.

Heretofore the testing of such equipment had to be under actual field conditions wherein a train was required to pass over a particular track segment repeatedly at various speeds or testing had to be simulated with non-moving components.

In view of the above, it is a principal object of the present invention to provide a wheel simulating machine which simulates the path of a wheel rolling along a straight line during a selected interval of time at approximately constant velocity.

A further object is to provide such a wheel simulator which can accurately simulate under laboratory conditions the movement of a railroad car wheel at speeds ranging from 0 to upwards of 200 miles per hour.

SUMMARY OF THE INVENTION

The above and other beneficial objects and advantages are attained in accordance with the present invention by providing a wheel simulator machine comprising a balanced rotor driven by a variable speed drive. A stationary pulley is fixed to the machine frame. At one end of the rotor a wheel sector is rotatably mounted and a second pulley is secured to the wheel sector shaft. The stationary pulley and wheel sector pulley are connected by a positive transmission member such as a timing belt or chain so that the wheel sector rotates in the direction opposite to the direction of rotation of the rotor. The combined distance from the axis of the wheel sector to its tangent plus the distance between the rotor shaft and wheel sector shaft are equivalent to the radius of the wheel to be simulated. The ratio of diameters between the stationary pulley and wheel sector pulley is 2:1.

DETAILED DESCRIPTION OF THE PREFERRED EMBODIMENT

Figure 2:
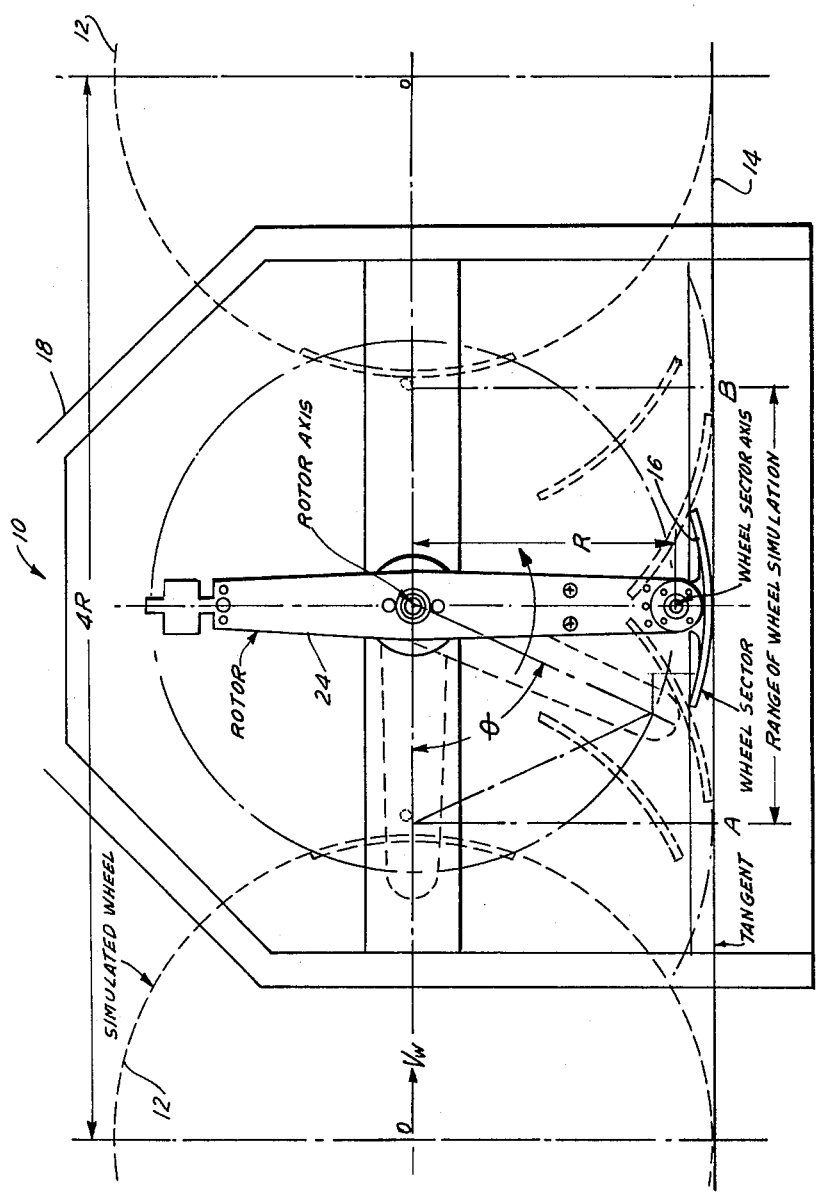
FIG. 2 is a simplified side elevational diagrammatic view of the wheel simulator and path of the simulated wheel.

Reference is first made to FIG. 2 wherein wheel simulator 10 particularly adapted to simulate a railroad car wheel is shown along with an imaginary wheel 12 hypothetically moving along at a velocity $V_w$ along a path 14. The wheel simulator 10 simulates the motion of wheel 12 within the sector A-B. That is, the wheel sector portion 16 of the wheel simulator 10 corresponds in position within the range A-B to a simulated wheel 12 rolling along path 14 which includes sector A-B.

Figure 1:
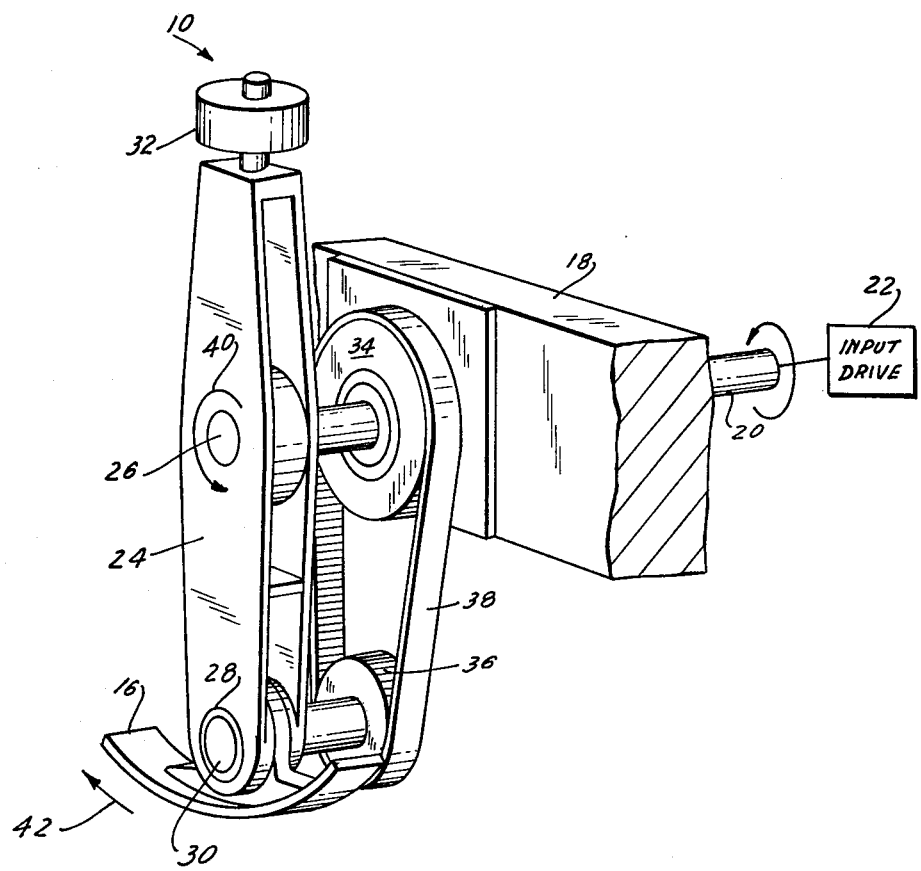
FIG. 1 is a perspective view of a wheel simulator in accordance with the present invention.

The details of the construction of wheel simulator 10 are shown in FIG. 1. The wheel simulator 10 comprises a frame 18 supporting for rotation a rotor drive shaft 20. The rotor drive shaft is connected at one end to a variable speed drive 22 and at the opposite end to a dynamically balanced rotor 24. In this connection, the drive shaft 20 passes through the rotor axis 26. Rotor 24 carries at one end wheel sector 16 supported through a suitable bearing 28 on shaft 30. A counter weight 32 is mounted to the opposite end of rotor 24. The wheel sector 16 has a radius of curvature equal to the radius of the hypothetical wheel 12 whose motion is to be simulated.

A stationary pulley 34 is mounted to frame 18. A wheel sector pulley 36 is mounted about shaft 30. Pulleys 34 and 36 are connected by a positive transmission 38 (i.e., without slippage) such as a timing belt, chain, gear or the like. As a result, as rotor 24 rotates in one direction (such as shown by arrow 40) the wheel sector 16 will rotate in the opposite direction as shown by arrow 42. The rotation of wheel sector 16 is passive in that no separate motor is required for its rotation.

The distance from the wheel sector axis (i.e., the center of shaft 30) to a tangent drawn to the wheel sector plus the distance from the center of shaft 20 to the center of shaft 30 is equal to the radius of the hypothetical wheel 12 as the motion is to be simulated. The ratio of diameter of pulleys 34 to 36 is 2:1.

The motion of the mechanism is such that when drive 22 rotates shaft 20 and hence rotor 24 in one direction the wheel sector 16 driven by timing belt 38 rotates in the opposite direction. As a result, when the wheel sector 16 is sweeping across the interval A-B it remains tangent to the straight line 14 shown in the illustration. In other words, the wheel simulator simulates the hypothetical wheel 12 as it rolls from A to B along the path 14 of FIG. 2. During the motion of wheel sector 16 from A to B the linear velocity of the wheel sector is approximately 6% constant linear velocity $V_w$ for simulated wheel 12. The instantenous velocity of the simulated wheel is defined by the formula:

$$V_x = 2R\omega \text{SIN } \theta \text{ (FT/SEC)}$$

where:

$$\omega = \text{RPM} \times \frac{2\pi}{60} \left( \frac{\text{Radians}}{\text{SEC}} \right)$$

$\theta$ = Rotor angle displacement $R$ = Distance from Rotor Axis to Wheel Sector Axis (FT)

In an actual embodiment wherein a 36 inch diameter railroad wheel was to be simulated, the radius of the rotor (from shaft 26 to shaft 30) was 15.9"; the distance from shaft 30 to a tangent to the weheel sector was 2.1"; and the distance A-B was 21.23".

Thus, in accordance with the above, the aforementioned objects are effectively attained.

Having thus described the invention, what is claimed is:

1. A wheel movement simulator comprising:
   a frame: a drive shaft mounted for rotation to said frame;
   a rotor secured to said shaft for rotation therewith;
   a wheel sector secured for rotation to said rotor;
   means for rotating said drive shaft; and
   means for rotating said wheel sector in the direction opposite to the rotation of said drive shaft as said drive shaft rotates.

2. The movement simulator in accordance with claim 1 wherein said wheel sector is passively rotated by the rotation of said drive shaft.

3. The movement simulator in accordance with claim 1 further comprising a first pulley mounted to said frame; a second pulley mounted to said wheel sector for rotation therewith, and non-slip transmission means connecting said pulleys.

4. The movement simulator in accordance with claim 3 wherein said first pulley is twice the diameter of said second pulley.

5. The movement simulator in accordance with claim 1 wherein said rotor is dynamically balanced.

6. The movement simulator in accordance with claim 1 wherein the distance from the axis of rotation of the wheel sector to its tangent plus the distance from the axis of the rotor to the axis of the wheel sector is equal to the radius of the wheel the movement of which is to be simulated.

* * * * *